United States Patent [19]

Degady et al.

[11] Patent Number: 5,135,760
[45] Date of Patent: Aug. 4, 1992

[54] REDUCING SUGAR LUMPS BY DUAL GUM BASE INJECTION IN A COROTATING TWIN SCREW EXTRUDER

[76] Inventors: Marc Degady, 4 Connelley Dr., Budd Lake, N.J. 07828; Albert J. Lesko, 228 Mount Pleasant Ave., Wallington, N.J. 07057

[21] Appl. No.: 683,406

[22] Filed: Apr. 10, 1991

[51] Int. Cl.⁵ ............................................. A23G 3/30
[52] U.S. Cl. ...................................... 426/5; 426/516; 366/83; 366/84; 366/85; 366/86
[58] Field of Search ................................ 426/3–6, 426/231, 516, 512, 1; 366/83, 84, 85, 86

[56] References Cited

U.S. PATENT DOCUMENTS

| | | | |
|---|---|---|---|
| 4,555,407 | 11/1985 | Kramer et al. | 426/516 |
| 4,597,738 | 4/1986 | Cherukuri et al. | 426/5 |
| 4,861,615 | 8/1989 | Wiedmann | 426/516 |
| 4,940,594 | 7/1990 | Van Alstine | 426/516 |
| 4,975,288 | 12/1990 | Hager | 426/5 |
| 5,045,325 | 9/1991 | Lesko et al. | 426/516 |

*Primary Examiner*—Jeanette Hunter

[57] ABSTRACT

A method for the continuous preparation of a chewing gum mass is disclosed which includes reducing the agglomerations of the solid ingredients contained in the gum mass in minimum time. The method includes introducing powdered chewing gum ingredients and a first portion of a liquid gum base into an extruder and forming a premix and thereafter combining the premix with a second portion of gum base. The premix and second portion of gum base are then extruded over a distance and in a unidirectional flow to provide a substantially homogeneous chewing gum mass having minimal agglomerations of powdered chewing gum ingredients. In a preferred embodiment, the chewing gum mass is cooled during the unidirectional flow to the exit port to allow rolling, scoring and wrapping of the exiting chewing gum without requiring a separate cooling step.

22 Claims, 1 Drawing Sheet

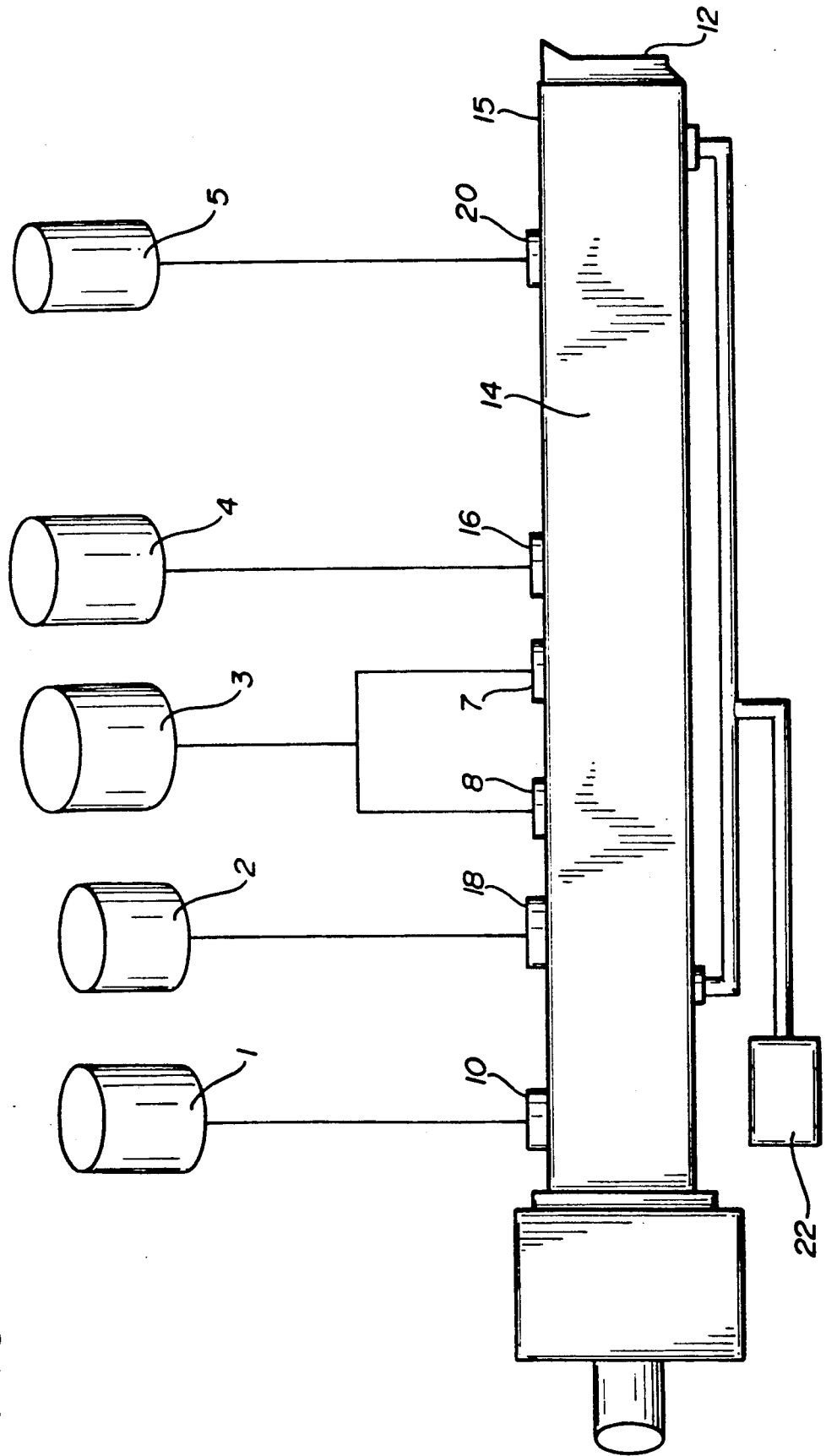

REDUCING SUGAR LUMPS BY DUAL GUM BASE INJECTION IN A COROTATING TWIN SCREW EXTRUDER

BACKGROUND OF THE INVENTION

The present invention relates to methods for producing chewing gums. In particular, the invention relates to a method for quickly eliminating agglomerated masses from chewing gums made by continuous extrusion.

The batch method of producing chewing gums has long been considered the standard for producing chewing gums on a commercial scale. Such methods, however, tend to be labor intensive and produce chewing gums of varying consistency. The batch process typically requires using large kettles for the extensive mixing and kneading of a gum base and plasticizers into a viscous melt. Thereafter, softeners and bulking agents such as sugars or sugar alcohols are added to the molten mass with stirring. Later, flavorings, such as flavor oils and/or spray-dried flavors, and sweeteners are added while mixing is continued until a homogenous mass is achieved. The chewing gum mass is thereafter cooled and then later rolled, scored and wrapped into the final product.

The above described method often required multiple mixing steps and transferral of the gum mass from various production apparatus and work areas until the final product was completed. Further, since the batch process is unmechanized, the various mixing and kneading steps require the continuous attention of the chewing gum artisan to determine when ingredients are to be added to the batch. Since the timing of the ingredient additions to the molten mass is subjectively based, the final products often varied in texture and/or flavor from batch to batch.

Over the years, various attempts by the industry to replace the batch process for the bulk manufacture of chewing gums have been made. U.S. Pat. Nos. 1,852,005 and 1,953,295 disclose early continuous production methods and apparatus for producing chewing gum strips. While providing continuous output of a chewing gum slab, these attempts have several shortcomings. For example, these patents disclose methods using a single entry port for the ingredients and subjecting all of the ingredients to plasticizing temperatures throughout an extrusion process before allowing a gum slab to exit. These methods, therefore, did not provide for differentiation between the chewing gum ingredients. Other deleterious effects on chewing gums associated with these methods include delicate ingredients such as flavor oils "flashing off" or degrading due to prolonged exposure to high temperatures and considerable pressure and/or incomplete integration of ingredients during extrusion. Incomplete mixing results in agglomerations of powdered gum bases and/or bulking agents such as sugar passing through the extruder and into the final product.

U.S. Pat. No. 3,455,755 discloses a method and apparatus for continuously casting slabs of chewing gums and for accordion-like pleating and stacking of the slab. This method, however, like the earlier methods described, relies upon a single entry port for introducing all of the chewing gum ingredients and, therefore, fails to address the separate mixing needs of the individual gum ingredients. By limiting introduction of the ingredients to a single port, some ingredients are mixed longer than necessary, while other ingredients like bulking agents such as sugar may not be mixed enough. Moreover, improper integration of the gum ingredients into the gum product is known to result in visible agglomerations in the final product. These imperfections in the method tend to produce a gum with inferior organoleptic qualities. The ability to precisely locate the crucial entry points for the chewing gum ingredients to provide complete mixing without damaging the ingredients is not disclosed. U.S. Pat. No. 3,644,169 has a similar disclosure to that of U.S. Pat. No. 3,455,755 described above.

More recently, U.S. Pat. No. 4,555,407 discloses a method for continuously forming wide, thin chewing gum slabs using a twin screw extruder. According to this method, a chewing gum paste is formed by continuously introducing into a first feed port of an extruder pelletized gum base, corn syrup, a portion of granulated sugar, plasticizer and coloring ingredients. The remaining sugar is introduced into a second port just past the first feed port while flavoring ingredients are added further downstream. Thus, while providing a continuous method for producing a gum paste slab, there is no suggestion that the agglomerations of solid chewing gum ingredients such as granulated sugar and/or bulking agents could be significantly reduced within the extruder to improve the final chewing gum product.

In the past, the additional mixing required to integrate the refractory agglomerations into the final chewing gum product was typically carried out by two directional mixing. This forward and reverse action would usually reduce agglomerations, but at substantial cost. At a minimum, the increased mixing time slows down the continuous production. Moreover, extended mixing can have harmful effects on sensitive chewing gum ingredients. By lengthening the time the ingredients are in the extruder and exposed to the high temperatures and high pressures which accompany such intense mixing, the integrity of the final gum product can be compromised.

It is also known that overzealous attempts at combining all chewing gum ingredients at a single entry point in the extruder barrel can result in the backing-up of the powdered ingredients at the source. When this phenomena occurs, the throughput must be discarded or reworked since the proportion of gum base to the powdered ingredients becomes skewed.

Accordingly, a need still exists for an improved method for the continuous production of chewing gum products.

It is, therefore, an object of the present invention to provide a method for continuously preparing chewing gums with minimum time for reducing the agglomerations of chewing gum ingredients within an extruder.

It is another object of the present invention to provide a method for the continuous preparation of chewing gums which avoids back-up of the powdered ingredients at the source of introduction.

SUMMARY OF THE INVENTION

In accordance with the present invention, a method for the continuous preparation of a chewing gum product from powdered chewing gum ingredients and a liquid gum base is provided. The method includes reducing the agglomerations within the powdered chewing gum ingredients in minimum time while the gum ingredients are extruded. In particular, the method provides introducing all powdered chewing gum ingredients and a first portion of the liquid gum base into an extruder at a distance from each other sufficient to prevent the back-flow of the ingredients and extrusion mixing the ingredients over a distance and in a unidirectional flow to form a premix. The method further includes introducing a second portion of liquid gum base into the extruder barrel a predetermined distance downstream from the introduction of the first portion of the liquid gum base and extrusion mixing the liquid gum base with the premix over a second distance in a unidirectional flow to provide a substantially homogeneous chewing gum mass with minimal agglomerations therein.

The powdered chewing gum ingredients may be selected from sugars, sugar alcohols such as sorbitol, mannitol, xylitol and the like, as well as mixtures thereof. The gum base may be selected from both natural and synthetic gum bases and is introduced into the extruder as a liquid maintained at a temperature of from about 65° to about 95° C.

Key to the method of the present invention, however, is the discovery that unidirectionally extruding the powdered ingredients with a first portion of gum base to form a premix before extruding the premix with a second portion of gum base will quickly provide a substantially homogeneous chewing gum mass having minimal agglomerations. Moreover, the present invention provides such chewing gum products without degrading any of the ingredients.

The predetermined distance between which the first portion of liquid gum base is introduced into the extruder barrel and where the second portion of the liquid gum base is introduced may range from about one-half to about fifteen times the diameter of the extruder barrel. In a preferred embodiment, however, the distance is equal to from about one-half to about seven times the diameter of the extruder barrel, while in a most preferred embodiment, the distance is equal to from about one to about two times the diameter of the extruder barrel.

Chewing gums made in accordance with the present invention may also include colorants, plasticizers, texturizers, sweeteners, flavors and mixtures thereof. The colorants may be selected from any suitable FD&C dyes; the plasticizers may be selected from glycerin, lanolin, stearic acid and the like, while an example of a suitable texturizer is corn syrup. The sweeteners which may be included in the gum products made in accordance with the method of the present invention include both natural and synthetic high-intensity sweeteners such as amino acid-based sweeteners, saccharin and its salts and the like. A flavor may also be included. Such flavors may be selected from flavor oils, spray-dried flavors, flavor-resin encapsulations, powdered flavors and mixtures thereof.

In a preferred embodiment, the method of the present invention is carried out in an extruder environment which is capable of cooling the chewing gum ingredients as they are extruded into a chewing gum mass. In this embodiment, there is provided a continuous chewing gum slab which is suitable for rolling and scoring without a separate cooling step. The distance over which the cooling occurs is from about twelve to about forty times the diameter of the extruder barrel. In a preferred embodiment, the distance over which the cooling occurs is from about fourteen to about twenty-four times the diameter of the extruder barrel, while in a most preferred embodiment, the distance over which cooling occurs is from about seventeen times to about nineteen times the diameter of the extruder barrel.

As a result of the present invention, a unique method for continuously preparing essentially agglomeration free chewing gum product is provided. Moreover, the reduction of agglomerations occurs in minimum time to preserve the integrity of the chewing gum ingredients. Unlike other methods of using extrusion apparatus for preparing chewing gums, the method of the present invention minimizes barrel residence time and includes a unidirectional extrusion flow. No reverse mixing or kneading is required to remove the agglomerations. By eliminating the reverse action of the mixing and kneading elements, the damaging excessive heat generation and pressure build-up are avoided. Thus, the integrity of the resulting chewing gum products is maintained, ingredient break-down is significantly reduced while at the same time substantially eliminating troublesome agglomerations of the powdered chewing gum ingredients in minimum time. Moreover, in a preferred embodiment, where the chewing gum mass is cooled prior to exiting the extruder, the product resulting from the present process can be rolled, scored and wrapped immediately after extrusion without a separate, time consuming cooling step.

For a better understanding of the present invention, together with other and further objects, reference is made to the following description, taken together with the accompanying drawing, and its scope will be pointed out in the appended claims.

BRIEF DESCRIPTION OF THE DRAWINGS

FIG. 1 is a schematic representation of a system for carrying out the present invention.

DETAILED DESCRIPTION OF THE INVENTION

It has now been surprisingly found that disadvantages associated with continuous preparation of chewing gums by extrusion systems can be overcome by using the method of the present invention. A key to the method of the present invention is the unexpected substantial elimination of agglomerated particles from the final chewing gum mass. This result is achieved by first forming a premix of the powdered chewing gum ingredients with a first portion of the gum base and thereafter extruding the premix with the remaining gum base a predetermined distance and in a unidirectional flow to form a chewing gum mass substantially devoid of agglomerations.

In a preferred embodiment, the method also includes introducing a member of the group consisting of colorants, sweeteners, plasticizers, texturizers, bulking agents, and mixtures thereof at preselected sites along the barrel of the extruder to provide varied chewing gum products.

A preferred multiple-zoned extruder useful in carrying out the method of the present invention has two intermeshing screw shafts composed of individual conveying and kneading elements of different pitches and lengths. Each intermeshing screw rotates in the same direction in the barrel in a bore having a figure eight cross section. The paddle elements of the extrusion apparatus can be set at various angles to provide mixing of the various chewing gum ingredients in a unidirectional flow without generating high temperatures and pressures which can damage the chewing gum ingredients. The method of the present invention eliminates the need for extrusion apparatus which reverse the direction of the barrel screw to effect mixing, kneading and removing of agglomerations.

The top of the extruder barrel useful in carrying out the method of the present invention contains numerous entry ports for introducing the various chewing gum ingredients. Those ports not being used for introducing the chewing gum ingredients are sealed to provide a closed system. Thermocouples may also be included for monitoring internal temperatures. The order of introduction of the ingredients aside from the powdered chewing gum ingredients is a matter of choice for the artisan. The final chewing gum product can be custom tailored by selecting different entry ports for the various chewing gum ingredients. For example, by moving the sweetener closer to the entry port designated for the introduction of the first portion of gum base, the sweetener will be less pronounced in the initial chew. On the other hand, introducing a sweetener downstream and in the direction of the exit port results in a chewing gum having an initial burst of sweetness.

Inasmuch as various extruder apparatus and barrel sizes are contemplated for inclusion in carrying out the method of the present invention, the distance between introduction points of the gum base portions is, therefore, best expressed as a function of the extruder barrel diameter. In this fashion, the fluid dynamics of extrusion flow may be optimally characterized without regard to particular extrusion apparatus.

The method of the present invention includes introducing powdered chewing gum ingredients and a first portion of a liquid gum base into an extruder barrel at a critical distance from each other which prevents backflow of the gum base and/or the powdered ingredients. This avoids creation of unwanted hot spots and/or discontinuities in the gum product. The distance may range from about five to about ten times the diameter of the extruder barrel. In a preferred embodiment, the distance is from about six to about eight times the extruder barrel diameter, while in a most preferred embodiment, the distance is about seven times the extruder barrel diameter. The chewing gum ingredients are extrusion mixed with the first portion of the gum base over a distance and in a unidirectional flow to form premix before combining the premix with a second portion of the liquid gum base. The second portion of the gum base is then extrusion mixed with the chewing gum premix over a distance and in a unidirectional flow to provide a substantially homogeneous chewing gum mass essentially devoid of agglomerations.

The predetermined distance downstream between which the first portion of gum base is introduced into the extruder and the second portion of gum base is introduced is from about one-half to about fifteen times the diameter of the extruder barrel. In a preferred embodiment, the distance is from about one-half to about seven times the diameter, while in a most preferred embodiment, the distance is equal to from about one to about two times the barrel diameter. It is over this distance that the premix is formed.

The feed rate of the gum base is, therefore, divided into at least two portions. The percentages of the feed rate, however, may vary according to the needs or desires of the artisan. For example, the first portion of gum base may include from about 10% to about 80% of the total feed rate depending upon the particular powdered ingredients and the desired premix consistency. The downstream introduction of the second portion of the gum base would, therefore, contain the complementary portion of the feed rate. In a preferred embodiment, however, the first portion of the gum base includes from about 20% to about 65% of the gum base feed rate, while in a most preferred embodiment, the first portion of gum base contains from about 33% to about 50% of the gum base feed rate.

The premix and the second portion of the gum base are then extrusion mixed over a distance and in a unidirectional flow to provide a substantially homogeneous chewing gum mass with minimal agglomerations of the powdered chewing gum ingredients. The distance over which the second portion of gum base and the premix are extruded is also expressed as a function of the extruder barrel diameter. The distance is preferably equal to from about 2 to about 24 times the diameter of the extruder barrel. Distances ranging from about 5 to about 19 are deemed preferable if the throughput is cooled after exiting the extruder barrel. Alternatively, distances ranging from about one-half to about twenty-four times the diameter are preferred and from about one-half to about five times the diameter are most preferred if the chewing gum mass is cooled prior to exiting the extruder.

The powdered chewing gum ingredients principally include sugars, sugar alcohols, mixtures thereof, and the like. Suitable sugar alcohols include, for example, sorbitol, mannitol, xylitol, and mixtures thereof. These powdered chewing gum ingredients as well as other powdered or dry ingredients typically found in conventional chewing gum products are introduced into the extruder via the entry port found furthest from the extruder exit port. Such powdered ingredients may be conveyed into the extruder with a metering system such as that available from K-tron.

Gum bases suitable for carrying out the method of the present invention may be selected from a wide variety of commercially available products. A gum base typically contains an elastomer component, a resin component, an elastomer solvent, plasticizers, mineral adjuvants, as well as conventional additives such as antioxidants, preservatives, colorants and the like.

In particular, the elastomer component of the gum base of the present invention can be selected from synthetic elastomers such as styrene-butadiene copolymers (butyl rubber), natural rubber (polyisoprene), as well as masticatory substances of natural origin, such as rubber latex solids, chicle, crown gum, nisparo, rosidinha, jelutong, pendare, perillo, niger gutta, tunu, etc. Mixtures of these materials are also useful.

The resin component, on the other hand, can be selected from polyvinyl butyl ester, copolymers of vinyl esters and vinyl ethers, polyethylene, ethylene-vinyl acetate copolymers, vinyl acetate-vinyl alcohol copolymers, vinyl acetate vinyl laurate copolymers, and in particular high molecular weight polyvinyl acetate, which is at least about 20,000 MWU.

The gum base usually includes an elastomer solvent. Such solvents may be selected from terpene resins, such as polymers of alpha-pinene or beta-pinene; rosin derivatives including hydrogenated or partially hydrogenated derivatives, such as the glycerol ester of polymerized rosin; alcohol esters of rosin, such as the glycerol ester of hydrogenated rosin, the pentaerythritol ester of hydrogenated rosin, the glycerol ester of rosin and mixtures thereof.

The gum base may also include an oleaginous plasticizer, such as hydrogenated vegetable oil, cocoa butter, natural waxes, petroleum waxes such as the polyethylene waxes, paraffin waxes, and microcrystalline waxes with melting points higher than 80° C., or mixtures thereof. These materials may be utilized generally as softeners.

The gum base may include mineral adjuvants such as calcium carbonate, magnesium carbonate, alumina, aluminum hydroxide, aluminum silicate, talc, tricalcium phosphate and the like; as well as mixtures thereof. These mineral adjuvants may also serve as fillers and texturizing agents.

Fatty acids may also be included to serve as softeners. Suitable fatty acids would include, for example, stearic acid, palmitic acid, oleic acid, and mixtures thereof. The gum bases also frequently include emulsifiers, particularly those that would be compatible with the vinyl polymer, if included in the base. Particularly, lecithin, glycerol monostearate, fatty acid monoglycerides, diglycerides and triglycerides, glycerol triacetate, propylene glycol monostearate and mixtures thereof may be used.

The gum base composition may also include conventional additives such as antioxidants, preservatives, colorants and the like. For example, titanium dioxide may be utilized as a colorant, and an antioxidant such as butylated hydroxytoluene, butylated hydroxyanisole, and mixtures thereof, may also be included.

Naturally, the gum bases may be prepared for a variety of products, including conventional gums and bubble gums, and the method of the present invention is not limited to utilizing a specific gum base formulation.

The metering of the gum base into the extruder barrel is dependent upon several factors. For example, when the revolutions per minute (rpm) of the co-rotating extruder screws is set at a predetermined rate, the gum base must be metered in such a way so that the product throughput (measured in kg/hr) is maintained. For purposes of illustration, the gum base would be metered in at about a total feed rate of 98 kg/hr when the screws are rotating at 150 revolutions per minute. It should be noted, however, that the introduction of the gum base as well as the other ingredients may be varied depending upon the extruder, the particular ingredients included in the chewing gum product and/or their proportions or the particular chewing gum sought. Introduction of the ingredients is also controlled by varying the feed rate.

The method of the present invention may further include introducing any number of well known chewing gum adjuvants at preselected sites along the barrel of the extruder to provide varied chewing gum products. Traditionally, such adjuvants include flavors, colorants, natural and artificial sweeteners, plasticizers, texturizers and the like.

Flavors which may be included are well known in the chewing gum art and may be chosen from natural and synthetic flavoring liquids such as volatile oils, synthetic flavor oils, flavoring aromatics and/or oils, and/or liquids, oleoresin or extracts derived from plants, leaves, flowers, fruits, etc., and combinations thereof. For example, the flavoring can be selected from spearmint oil, cinnamon oil, oil of wintergreen (methyl salicylate) and peppermint oil, clove oil, bay oil, oil of nutmeg, allspice, oil of sage, mace, oil of bitter almonds, and cassia oil. Also useful are artificial, natural or synthetic flavors such as vanilla and citrus oils including lemon, orange, grape, lime and grapefruit and fruit essences including apple, pear, peach, grape, strawberry, raspberry, cherry, plum, pineapple, apricot, etc.

Other useful flavorings include aldehydes and esters such as benzaldehyde (cherry, almond), citral, i.e., alphacitral (lemon, lime), neral, i.e., beta-citral (lemon, lime) aldehyde C-8 (citrus fruits), aldehyde C-9 (citrus fruits), aldehyde C-12 (citrus fruits), tolyl aldehyde (cherry, almond), 2-6-dimethyl-octanal (green fruit), and 2-dodecenal (citrus, mandarin), mixtures thereof and the like.

The flavors may also be included as spray dried flavors, flavor-resin encapsulations and/or powdered flavors.

Examples of the colorants which may be included are selected from any of the numerous dyes suitable for food, drug and cosmetic applications, and are well known in the art. The materials acceptable are typically referred to as FD&C dyes and a full recitation of these colorants and their corresponding chemical structures may be found in the *Kirk-Othmer Encyclopedia of Chemical Technology*. Vol. 5, pages 857-884, which is incorporated herein by reference. The colorant may be metered into the barrel of the extruder at any point in the extrusion process according to the preference of the artisan. The colorants may be water soluble or dispersed in a liquid and metered into the extruder barrel.

Likewise, sweeteners may be metered into the extruder barrel at different points along extrusion process according to preference. The further the sweetener is away from the exit port of the extruder barrel, however, the less pronounced it will be upon initial chew. This is due to the more intimate embedding of the sweetener with the chewing gum base and powdered mixture ingredients.

The sweeteners may be selected from the following nonlimiting list: sugars such as sucrose, glucose or corn syrup, dextrose, invert sugar, fructose, and mixtures thereof; high intensity sweeteners such as saccharin and its various salts such as the sodium or calcium salt; the dipeptide sweeteners such as aspartame, dihydroxguaiacol compounds, glycyrrhizin; *Stevia rebaudiana* (Stevioside); talin, dihydrochalcone, chloro derivatives of sucrose, cyclamic acid and its various salts such as the sodium salt, sucralose, dihydroflavinol; hydroxyguaiacol esters; L-aminodicarboxylic acid gem-diamines; L-aminodicarboxylic aminodicarboxylic acid aminoalkenoic acid ester amides; and sugar alcohols such as sorbitol, sorbitol syrup, mannitol, xylitol, and the like. Also contemplated as an additional sweetener is the non-fermentable sugar substitute (hydrogenated starch hydrolysate) which is described in U.S. Pat. No. Re. 26,959. Also contemplated is the synthetic sweetener 3,6-dihydro-6-methyl-1-1,2,3-oxathiazin-4-one-2,2-dioxide, particularly the potassium (acesulfame-K) sodium and calcium salts thereof as described in German Patent No. 2,001,017.7.

Plasticizers useful in the chewing gums include, for example, glycerin, lanolin, stearic acid, sodium stearate, potassium stearate, glycerol triacetate, hydrogenated vegetable oil and the like. In addition to its sweetening properties, corn syrup may be included in the chewing gums as a texturizer.

The method of the present invention also contemplates that each of the above chewing gum adjuvants may be added prior to, during, and/or after the formation of the premix composed of powdered chewing gum ingredients and the first portion of the gum base. In this manner, the individual mixing needs of each component of the desired resultant gum product may be addressed. For example, it may be desirable to include a colorant in the formation of the premix so that a uniform distribution is obtained. Similarly, it may be advantageous to include a flavor and/or high intensity sweetener in the premix to provide a long-lasting organoleptic experience. Additional amounts of flavor and/or sweetener may be included downstream to provide a more immediate release.

In a preferred embodiment, the method of the present invention is carried out in an extruder environment which cools the chewing gum ingredients as they are extruded to form a homogeneous chewing gum mass. In particular, the chewing gum mass is cooled during the unidirectional extension flow to the exit port. In this embodiment, the method provides a continuous output of a homogeneous chewing gum slab exiting the extruder which is not only substantially free of agglomerations, but also suitable for rolling, scoring and wrapping in the absence of a separate cooling step. One example of an extruder used for the continuous production of chewing gums and having externally applied cooling means is described in commonly assigned U.S. Pat. No. 5,045,325, the disclosure of which is accordingly incorporated by reference herein.

The distance over which such cooling is occurs is equal to from about twelve to about forty times the diameter of the extruder barrel. In a preferred embodiment, the distance is equal to from about fourteen to about twenty-four times the diameter of the extruder barrel, while in a most preferred embodiment, the distance is equal to from about seventeen to about nineteen times the diameter of the extruder barrel.

For illustrative purposes, a preferred embodiment of the method of the present invention will now be described using a representative chewing gum formula and the APV Baker Model No. MPF-80D co-rotating twin screw extruder having externally applied cooling means integral with the extruder barrel. Reference is made to FIG. 1, which schematically illustrates the apparatus.

A suitable formula for chewing gum capable of being produced according to the method of the present invention is set forth below in Table I.

TABLE I

Representative Chewing Gum Formula

| Ingredients | Parts by Weight |
| --- | --- |
| Gum Base | 28.071 |
| Sugar | 56.979 |
| Texturizer - Sweetener (corn syrup) | 12.335 |
| Color (dispersed in glycerin) | 1.044* |
| Flavor | 1.571 |
| | 100.000 |

Actual weight of color equals 0.115, actual weight of glycerin 0.929.

The gum base is heated and maintained at a temperature of between about 65° to about 95° C. in a holding tank 3. The gum base is metered into the barrel portion 14 of the extruder 15 through entry ports 7 and 8. For this particular run, 40% of the gum base feed rate is conveyed in the first portion via entry port 8 and 60% of the gum base feed rate is conveyed in the second portion via entry port 7.

The sugar is held in a vessel 1 and conveyed to the entry port 10 of the extruder barrel which is furthest from the extruder exit port 12. The texturizer and sweetener, in this case, corn syrup, is held in a holding tank 4 at a temperature of from about 29° to about 32° C. and metered into the extruder barrel 14 via an entry port 16. The color, in this case dispersed in a glycerin solution, is also placed into a holding tank 2 and metered into the extruder barrel via an entry port 18. The flavor is held in a tank 5 which is connected to the barrel of the extruder. Preferably, the flavor is introduced relatively late in the extrusion process via entry port 20 so that degradation is minimized and all flavor notes and nuances are preserved.

The sugar portion of the representative sample chewing gum is metered into the extruder about 11 centimeters from the beginning of the extruder barrel. The color and any softener, if desired, may be injected into the barrel at any feed port position. The first portion of gum base can be injected at any location between about the 40 to about the 80 centimeter feed position to be assured that no back-up of the sugar and gum base will occur. In this example, the second portion of the gum base was introduced about one times the diameter or 8 cm downstream from the point at which the first portion is introduced. Next, the corn syrup may be added between the 20 to the 172 centimeter feed positions depending on the gum product. Finally, the flavor may be injected at any feed port position depending upon the finished texture of the gum and flavor release desired.

At the outset, all valves which direct the flow of gum ingredients to the extruder are opened. The extruder twin screws are set at a moderate pace, for example 70 rpm. The pumps for all the liquid raw materials and sugar are set for 300 kg/hr product throughput. In this example, all of the extruder internal zones were cooled by a cooling system 22 to a temperature of between about 0° F. to about 50° F. depending upon the gum formula. In less than a minute after start-up, finished product began to appear at the discharge end. The temperature and delivery rate of the raw materials, screw rpm and barrel temperature were maintained during this stage of the run to achieve a steady state, reached in about a half hour. Once at steady state, it was possible to increase the throughput of the machine up to 500 kg/hr at 180 rpm screw speed. At this point, the continuous blanket of gum coming out of the extruder die was directed to a take off belt for removal to rolling and scoring and dusting operations without requiring further cooling. Upon inspection, the chewing gum was determined to be free of agglomerations and provided a pleasant organoleptic experience throughout the chew.

If the externally applied cooling embodiment is not desired, the continuous supply of the gum mass is cooled after exiting the extruder to a temperature sufficient to allow the above-described rolling, scoring and dusting steps.

While there have been described what are presently believed to be the preferred embodiments of the invention, those skilled in the art will realize that changes and modifications may be made thereto without departing the spirit of the invention, and it is intended to claim all such changes and modifications as fall within the true scope of the invention.

What is claimed is:

1. A method for continuous preparation of a chewing gum mass for producing a gum product from powdered chewing gum ingredients and a liquid gum base, said method including minimum time for reducing the agglomerations within said powdered chewing gum ingredients, comprising:

a) introducing said powdered chewing gum ingredients and a first portion of said liquid gum base into an extruder barrel at a distance from each other sufficient to prevent the back-flow of said powdered chewing gum ingredients and said liquid gum base;

b) extrusion mixing said powdered chewing gum ingredients and said first portion of said liquid gum base in a unidirectional flow to form a premix;

c) introducing a second portion of said liquid gum base into said extruder barrel a predetermined distance downstream from said introducing of said first portion of said liquid gum base; and d) extrusion mixing said second portion of said liquid gum base with the premix obtained as a result of step (b) over a distance and in a unidirectional flow to provide a substantially homogeneous chewing gum mass exiting said extruder barrel having minimal agglomerations of said powdered chewing gum ingredients therein.

2. The method of claim wherein said powdered chewing gum ingredients are selected from the group consisting of sugars, sugar alcohols and mixtures thereof.

3. The method of claim 2, wherein said sugar alcohols are selected from the group consisting of sorbitol, mannitol, xylitol and mixtures thereof.

4. The method of claim 3, wherein said gum base is selected from the group consisting of styrene-butadiene copolymer, polyisobutylene, isobutylene-isoprene copolymer (butyl rubber), natural rubber (polyisoprene), rubber latex solids, chicle, crown gum, nisparo, rosidinha, jelutong, pendare, perillo, niger gutta, tunu, and mixtures thereof.

5. The method of claim 4, wherein said gum base is heated to a temperature of from about 65° to 95° C. prior to introduction into said extruder.

6. The method of claim 5, wherein said distance separating said introducing of said powdered chewing gum ingredients and said first portion of liquid gum base is equal to from about five to about ten times the diameter of the extruder barrel.

7. The method of claim 6, wherein said distance separating said introducing of said powdered chewing gum ingredients and said first portion of liquid gum base is equal to from about six to about eight times the diameter of the extruder barrel.

8. The method of claim 7, wherein said distance separating said introducing of said powdered chewing gum ingredients and said first portion of liquid gum base is equal to about seven times the diameter of the extruder barrel.

9. The method of claim 8, wherein said predetermined distance downstream for the introduction of said second portion of said liquid gum base is equal to from about one-half to about fifteen times the diameter of the extruder barrel.

10. The method of claim 9, wherein said predetermined distance downstream for the introduction of said second portion of said liquid gum base is equal to from about one-half to about seven times the diameter of the extruder barrel.

11. The method of claim 10, wherein said predetermined distance downstream for the introduction of said second portion of said liquid gum base is equal to from about one to about two times the diameter of the extruder barrel.

12. The method of claim 11, further comprising introducing a member selected from the group consisting of colorants, plasticizers, texturizers, sweeteners, flavors and mixtures thereof into said extruder barrel while said powdered chewing gum ingredients are extrusion mixed with said first portion of said liquid gum base.

13. The method of claim 11, further comprising introducing a member selected from the group consisting of colorants, plasticizers, texturizers, sweeteners, flavors and mixtures thereof into said extruder barrel while the premix obtained as a result of step (b) of claim 1 is extrusion mixed with said second portion of said liquid gum base.

14. The method of claim 12 or 13, wherein said plasticizers are selected from the group consisting of glycerin, lanolin, stearic acid, sodium stearate, potassium stearate, glycerol triacetate, hydrogenated vegetable oils and mixtures thereof.

15. The method of claim 14, wherein said texturizer is corn syrup.

16. The method of claim 15, wherein said sweeteners are selected from the group consisting of amino acid-based sweeteners, dipeptide sweeteners, glycyrrhizin, saccharin and its salts, acesulfame salts, cyclamates, steviosides, talin, sucralose, dihydrochalcone compounds and mixtures thereof.

17. The method of claim 16, wherein said flavor is selected from the group consisting of flavor oils, spray dried flavors, flavor resin encapsulations, powdered flavors and mixtures thereof.

18. The method of claim 17, wherein said flavors are selected from the group consisting of spearmint oil, cinnamon oil, oil of wintergreen, (methyl salicylate), peppermint oil, lemon oil, orange oil, grape oil, lime oil, grapefruit oil, apple essence, strawberry essence, cherry essence, pineapple essence, banana oil and mixtures thereof.

19. The method of claim 18, further comprising cooling said chewing gum mass over a distance during the unidirectional flow of said extrusion mixing to provide a chewing gum mass exiting said extruder barrel which can be rolled and scored in the absence of separate cooling.

20. The method of claim 19, wherein the distance over which said chewing gum mass is cooled is equal to from about 12 to about 40 times the diameter of the extruder barrel.

21. The method of claim 20, wherein the distance over which said chewing gum mass is cooled is equal to from about 14 to about 24 times the diameter of the extruder barrel.

22. The method of claim 21, wherein the distance over which said chewing gum mass is cooled is equal to from about 17 to about 19 times the diameter of the extruder barrel.

* * * * *